United States Patent [19]
Higuchi et al.

[11] Patent Number: 5,399,025
[45] Date of Patent: Mar. 21, 1995

[54] BEARING STRUCTURE FOR MOTOR

[75] Inventors: Yoji Higuchi, Okazaki; Katsuhiko Torii, Shizuoka, both of Japan

[73] Assignee: Asmo Co., Ltd., Japan

[21] Appl. No.: 993,353

[22] Filed: Dec. 18, 1992

[30] Foreign Application Priority Data

Dec. 25, 1991 [JP] Japan ................... 3-357688

[51] Int. Cl.⁶ .................... F16C 17/08; H02K 5/00
[52] U.S. Cl. .................... 384/428; 29/898.07; 310/90; 384/223; 425/588
[58] Field of Search ............... 384/428, 240, 243–246, 384/247, 261, 295, 537, 585, 536, 582; 29/898.049, 898.05, 898.07, 898.12, 898.13; 425/555, 572, 588, 809; 310/42, 43, 90

[56] References Cited

U.S. PATENT DOCUMENTS

| | | | |
|---|---|---|---|
| 3,176,172 | 3/1965 | Thompson et al. | 310/42 |
| 3,482,125 | 12/1969 | Fleckenstein | 384/537 X |
| 4,321,748 | 3/1982 | Ito | 29/596 |
| 5,212,999 | 5/1993 | Kitada | 384/223 X |
| 5,213,000 | 5/1993 | Saya et al. | 74/425 |

FOREIGN PATENT DOCUMENTS

| | | |
|---|---|---|
| 54-67611 | 5/1979 | Japan . |
| 61-56701 | 12/1986 | Japan . |
| 62-42196 | 10/1987 | Japan . |
| 1133545 | 9/1989 | Japan . |

*Primary Examiner*—Daniel P. Stodola
*Attorney, Agent, or Firm*—Stetina Brunda & Buyan

[57] ABSTRACT

A bearing structure for a motor includes an adjustable bearing for providing radial support to a rotor housed within a casing. The adjustable bearing is positionable along a radial direction relative to the casing, and forms a space with inner wall of the casing. The casing has an open injection port for communicating with the space. The space is filled with a resineous filling material that is injected through the injection port, for securing the adjustable bearing within the casing.

9 Claims, 2 Drawing Sheets

BEARING STRUCTURE FOR MOTOR

BACKGROUND OF THE INVENTION

1. Field of the Invention

The present invention relates generally to a bearing for a motor. More particularly, this invention relates to a resin injected bearing, for use in a small motor for a power window or a wiper of a vehicle.

2. Description of the Related Art

In general, the mechanism for driving a power window is equipped with a small motor which is combined with a worm reduction gear having a worm gear mechanism. The housing of the worm reduction gear is attached to the casing of the motor. The rotor of the motor, the worm screw, etc. are housed in the space defined by the housing and the casing. The worm screw is coupled to the distal end portion of the rotor shaft.

The rotor integrated with the worm screw, is supported by three radial bearings provided at the distal end portion of the worm screw, the rear end portion of the rotor and the middle between the rotor and worm screw. To avoid adverse influence caused by misalignment of the axes of the casing and the housing, when they are assembled together, the conventional drive mechanism for a power window provides a large clearance (about 0.1 mm), between the distal end portion of the worm shaft and the associated radial bearing.

If the clearance between the distal end portion of the worm shaft and the associated radial bearing is large, when the motor is rotated, two events may occur. The first is that the worm shaft rotates while contacting the radial bearing, and the second is that the worm shaft rotates without contacting the radial bearing. In this case, the noise generated by the driving motor will vary between those two events, and may be offensive or unpleasant to the ear.

The power window should normally be locked at the uppermost position and the lowermost position. With a large clearance provided between the distal end portion of the worm shaft and the associated radial bearing, the worm screw may escape from the worm wheel at the time the window glass is locked, thus resulting in insufficient engagement therebetween. As a result, a large load is applied only to the middle of the three radial bearings, thus interfering with the smooth activation of the rotor. In addition, if the centering of the housing of the worm reduction gear is improper with respect to the motor casing, bending stress will be applied to the rotor shaft such that the motor cannot provide the original driving power.

As an attempted solution to the aforementioned problems, the work precision of members, such as the housing and the motor casing, may be improved to make the clearance between the distal end portion of the worm shaft and the associated radial bearing smaller than the conventional clearance. The use of the state-of-the-art technology to provide such a high working precision will undesirably result in significant rise in the production cost of motors.

Japanese Patent Examined Publication No. 61-56701 discloses a motor which has a thrust bearing formed of synthetic resin injected into the motor casing. As the distal end of the worm coupled to the rotor abuts on this thrust bearing, the movement of the worm screw and rotor in the thrust direction is restricted, thus ensuring their position.

When the distal end portion of the worm shaft directly contacts the thrust bearing which is formed of synthetic resin, the resin will be worn out through long usage, thus disabling the continuous and accurate positioning of the worm screw and rotor. Further, bearings formed by resin injection have an inherent shortcoming that cooling-originated contraction will form a clearance between itself and the inner wall of the motor casing or housing, to thereby impair the sealability of the inner space.

SUMMARY OF THE INVENTION

Accordingly, it is a primary object of the present invention to provide a bearing structure for a motor which can accurately center a plurality of radial bearings that support the rotor at multiple points.

It is another object of the present invention to provide a bearing structure for a motor which can maintain the accurate positioning of the rotor shaft in the thrust direction for a long period of time.

To achieve the foregoing and other objects and in accordance with the purpose of the present invention, an improved bearing structure is provided for supporting a rotor housed in the casing of the motor.

The bearing structure includes an adjustable bearing for providing radial support for the rotor. The adjustable bearing is positionable along the radial direction with respect to the casing, and forms a space (S1) with the inner wall of the casing. The casing has an injection port for allowing the space (S1) to communicate with the outside of the motor. The space (S1) is filled with resineous filling material that is injected through the injection port. The adjustable bearing is secured in the casing by the resineous filling material.

Another bearing structure includes an adjustable bearing for providing thrust support to the rotor. The adjustable bearing is positionable along the axial direction with respect to the casing, and forms a space (S2) with the inner wall of the casing. The casing has an injection port for allowing the space (S2) to communicate with the outside of the motor. The space (S2) is filled with resineous filling material injected through the injection port. The adjustable bearing is secured in the casing by the resineous filling material.

It is preferable that the casing of each of the above two bearing structures include a projecting wall formed integrally on the casing, to surround the injection port, and that each bearing structure further comprise a cap, formed integrally of resin, which fills up the associated space, for covering the corresponding projecting wall. This cap enhances the sealability of the casing.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
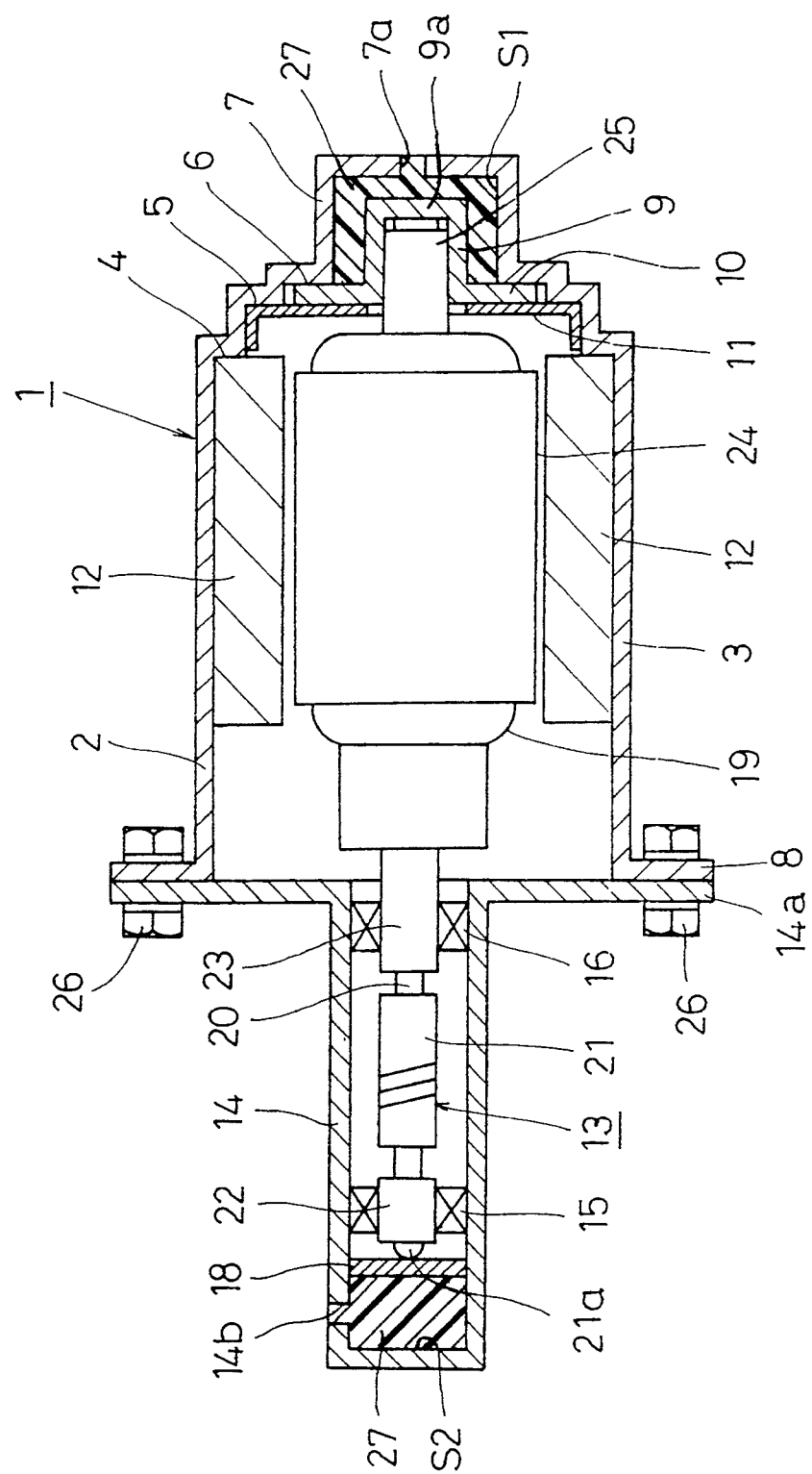
FIG. 1 is a cross sectional view illustrating the interior of a motor according to a first embodiment of the present invention.

A preferred embodiment of the present invention as applied to a motor for a power window will now be described with reference to FIG. 1. A motor 1 has a casing 2, which includes a sleeve portion 3, and a flange 8 which is formed integrally at the front end thereof. Field magnets 12 are mounted on the inner wall of the sleeve portion 3. The casing 2 further includes first, second and third steps or shoulders 4, 5 and 6, respectively, and a bearing mounting portion 7, which are formed integrally with the sleeve portion 3, to block the rear end of the sleeve portion 3. The first, second and third steps 4, 5 and 6, and the bearing mounting portion 7 are formed in such a way as to gradually and discretely decrease the inner diameters of the outer wall of the casing 2. An injection port 7a is formed in the center of the end face of the bearing mounting portion 7.

An adjustable bearing 9 having a flange 10 is disposed in the bearing mounting portion 7, in such a manner that the flange 10 abuts on the third step 6. A holder 11 is secured to the second step 5, and holds the flange 10 from the rear side. With this arrangement, the adjustable bearing 9 is supported movably in the radial direction in the casing 2. Formed between the adjustable bearing 9 and the bearing mounting portion 7 is a space S1 which is filled with resinous material.

A rotor 19 is disposed in the casing 2, and has a rotor shaft 20 and a rotor core 24. A plurality of field magnets 12 mentioned earlier are mounted around the rotor 19 on the inner wall of the sleeve portion 3 of the casing 2.

A worm reduction gear drive 13 is disposed at the front end of the casing 2. The worm reduction gear drive 13 is provided with a housing 14, which has an integrally formed flange 14a and an injection port 14b formed in the front end. The housing flange 14a and the casing flange 8 are connected together by a plurality of bolts 26, whereby the front opening of the casing 2 is blocked by the housing 14.

Two radial bearings 15 and 16 are secured in the housing 14. A plate-shaped thrust bearing 18 is fitted in the housing 14 to be slidable along the axis of the housing 14. The thrust bearing 18 separates the interior of the housing 14 into front and rear portions, and forms a space S2 between the inner wall of the front end portion of the housing 14 and the thrust bearing 18. Resin is injected in the space S2. The adjustable bearing 9 and the thrust bearing 18 are made of material that has excellent abrasion resistance (such as ceramics, and oil impregnated sintered metals belonging to copper-iron metal groups).

The front portion of the rotor shaft 20 is positioned in the housing 14. The rotor shaft 20 has a generally spherical or semi-spherical distal end portion 21a, which abuts the thrust bearing 18, a front journal 22, a central journal 23 and a rear journal 25. The front journal 22 and central journal 23 are respectively received by the radial bearings 15 and 16, and the rear journal 25 is received by the adjustable bearing 9. Accordingly, the rotor 19 is supported rotatably in the casing 2 and the housing 14.

A worm screw 21 is formed on the rotor shaft 20, between the front journal 22 and the central journal 23. This worm screw 21 engages a worm wheel (not shown) provided in the worm reduction gear drive 13 to transmit the power of the motor 1 to the gear drive 13.

With the rotor 19 disposed in the casing 2, the housing 14 is attached to the casing 2. In the event the housing 14 is secured to the casing 2, while the axial center of the housing 14 is not aligned with the center of the casing 2, due to manufacture errors in the casing 2 and/or the housing 14, the adjustable bearing 9 can be moved or slid so that its axial center is properly aligned with the axial center of the housing 14.

After the housing 14 is attached to the casing 2, synthetic resin 27, such as polyacetal resin, is injected into the spaces S1 and S2, via the respective injection ports 7a and 14b. The resin injected in the space S1 is solidified when cooled, thus securing the adjustable bearing 9 in position. The resin injected in the space S2 pushes the thrust bearing 18 at the time of injection, causing it to abut on the distal end portion 21a of the rotor shaft 20. The resin injected in the space $S_2$ also pushes the rotor 19 and the worm screw 21 via the thrust bearing 18, until the rear end portion of the rotor shaft 20 contacts a bottom wall 9a of the adjustable bearing 9. Thus, the thrust bearing 18, the rotor 19 and the worm screw 21 are positioned in the thrust direction. The resin injected in the space $S_2$ is solidified when cooled to hold the thrust bearing 18 in location.

According to this embodiment, even if the axial center of the casing 2 is misaligned with that of the housing 14, when they are assembled, the radial sliding of the adjustable bearing 9 can compensate for the misalignment of the central axes of the bearings provided at the front and rear of the rotor shaft 20. Therefore, large clearances do not need to be provided between the two bearings 15 and 16 in the housing 14 and the associated journals 22 and 23 of the rotor shaft 20, but can be set to a small value (5 $\mu$m to 40 $\mu$m).

When the power window is locked, small clearances between the rotor shaft 20 and the bearings 15 and 16 prevent the worm screw 21 from escaping from the worm wheel. That is, improper engagement between the worm screw 21 and the worm wheel can be avoided. Unlike the prior art, therefore, this embodiment will prevent a large load from being applied only to the bearing 16 corresponding to the central journal 23, and will not thus interfere with the smooth reactivation of the motor. In addition, it is sufficient to provide a working precision for the casing 2 and housing 14 and a precision of assembling them together as high as those in the conventional art, thus resulting in reduction of the manufacturing cost of the motor.

According to this embodiment, synthetic resin is injected in the space S2 in the housing 14 to position the thrust bearing 18, and to restrict the movement of the rotor shaft 20 in the thrust direction. The injected synthetic resin does not therefore directly contact the rotor shaft 20. This motor does not have the aforementioned problem of the conventional type that the resin is worn out through long usage so that the accurate positioning of the rotor shaft cannot be maintained for a long period of time.

Although only one embodiment of the present invention has been described herein, it should be apparent to those skilled in the art that the present invention may be embodied in many other specific forms without departing from the spirit or scope of the invention. Particularly, it should be understood that this invention can be embodied in the following forms.

Although the motor shown in FIG. 1 uses a radial bearing mechanism including the adjustable bearing 9 and a thrust bearing mechanism including the thrust bearing 18, each mechanism may be used separately.

Figure 2:
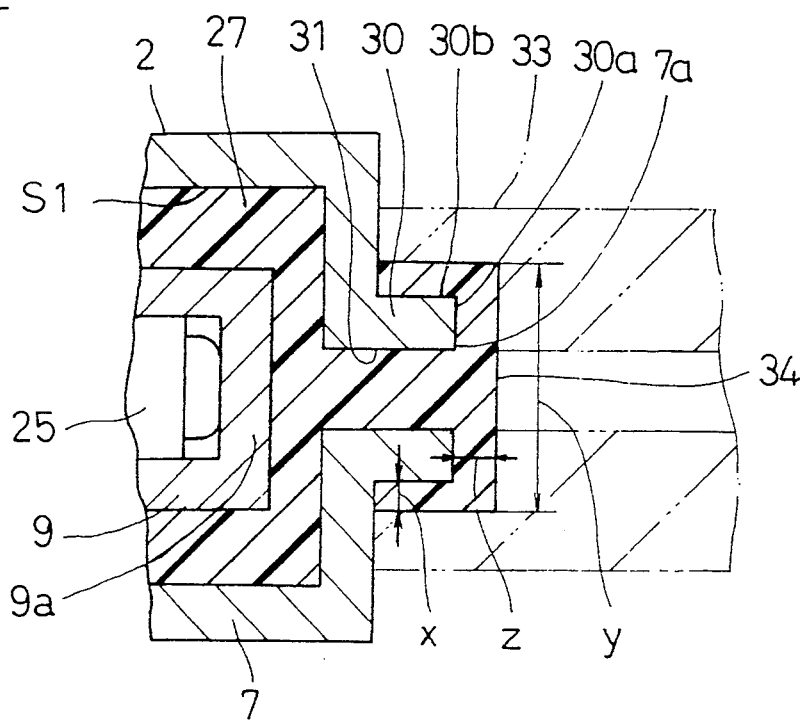
FIGS. 2 and 3 are enlarged cross sectional views of essential portions, illustrating another bearing structure for the motor.

In another motor shown in FIG. 2, a projecting wall 30 is formed integrally with the casing 2, so as to surround the injection port 7a of the bearing mounting portion 7. The projecting wall 30 forms an extended resin injection passage 31. An injector for injecting resin in the space S1 of the motor has a nozzle 33 having the distal end shaped to cover an end face 30a and an outer surface 30b of the projecting wall 30 at given intervals (z and x). As this injector is mounted on the casing 2 as shown in FIG. 2 and resin is injected into the space S1, a cap 34 for covering the injection port 7a, is simultaneously formed around the projecting wall 30.

Figure 3:
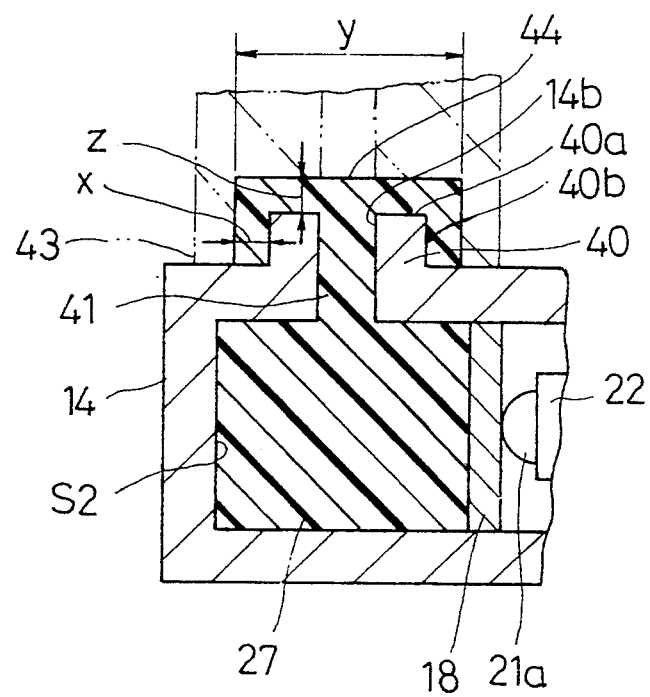

As shown in FIG. 3, a projecting wall 40, which forms an extended resin injection passage 41, may be formed to surround an injection port 14b of a housing 14, as in the case of FIG. 2. In this case too, an injector for injecting resin in the space S2, has a nozzle 43 having the distal end shaped to cover an end face 40a and an outer surface 40b of the projecting wall 40, at given intervals (z and x). A cap 44, for covering the injection port 14b, is formed around the projecting wall 40, simultaneously with the injection of the resin in the space S2, as in the previous case.

With the structures shown in FIGS. 2 and 3, when the injected resin is cooled and solidified, the resin contracts in the axial direction and radial direction of the rotor shaft. The diameter (y) of the top of the cap 34 (or 44) is larger than the width (2×) of that portion, which covers the outer surface 30b (or 40b) of the projecting wall, and the length of the cap 34 (or 44) along the resin injection passage 31 (or 41), is greater than the thickness (z) of the cap 34 (or 44). The contraction of the resin therefore provides tight sealing between the inner wall of the cap 34 (or 44), and the end face 30a (or 40a), and the outer surface 30b (or 40b) of the projecting wall 30 (or 40). Unlike conventional structures, the present structures do not require a sealing compound to block the injection port 7a (or 14b).

Therefore, the present examples and embodiments are to be considered as illustrative and not restrictive, and the invention is not to be limited to the details given herein, but may be modified within the scope of the appended claims.

What is claimed is:

1. A bearing structure for use in a motor, for supporting a rotor housed in a casing of the motor, the bearing structure comprising:

bearing means for providing radial support for the rotor, and for forming a space in the casing in cooperation with an inner wall of the casing;

the casing having an injection port for communicating with said space and a projecting wall formed integrally on the casing to surround said injection port;

resinous filling injected through said injection port into said space, for securing said bearing means in the casing; and a cap formed integrally with said resinous filling, for covering said projecting wall.

2. The bearing structure according to claim 1, wherein said bearing means includes a bearing having a flange and being positionable in a radial direction relative to the casing; and wherein the casing has a bearing mounting portion for guiding said flange of said bearing along a radial direction for adjustment of the bearing.

3. The bearing structure according to claim 2, further comprising flange pressing means for axially restraining said flange of said bearing against said hearing mounting portion, in order to guide said flange along said radial direction, in cooperation with said bearing mounting portion.

4. The bearing structure according to claim 2, wherein said bearing has a portion for restricting the movement of the rotor along a thrust direction.

5. A bearing structure for use in a motor, for supporting a rotor housed in a casing of the motor, the bearing structure comprising:

bearing means for providing thrust support for the rotor, and for forming a space in the casing in cooperation with an inner wall of the casing, said bearing means being positionable along an axial direction relative to the casing during assembly of the bearing structure;

the casing having an injection port for communicating with said space, and a projecting wall formed integrally on the casing, for surrounding said injection port;

resinous filling injected through said injection port into said space, for securing said bearing means in the casing; and a cap formed integrally with said resinous filling, for covering said projecting wall.

6. The bearing structure according to claim 5, wherein said bearing means includes a plate-shaped thrust bearing.

7. A motor comprising:

a casing;

a rotor housed in said casing;

first bearing means for providing radial support to said rotor, and for forming a first space in the casing in cooperation with an inner wall of the casing, said first bearing being positionable along a radial direction relative to said casing during assembly of the bearing structure;

second bearing means for providing thrust support to said rotor, and for forming a second space in the casing in cooperation with said inner wall of said casing, said second bearing means being positionable along an axial direction relative to said casing during assembly;

said casing having a first injection port for communicating with said first space and a second injection port for communicating with said second space, said casing further having a projecting wall formed integrally thereon, for surrounding one injection port selected from said first and second injection ports;

a first resinous filling injected through said first injection port into said first space, for securing said first bearing means in said casing;

a second resinous filling injected through said second injection port into said second space, for securing said second bearing means in said casing; and a cap for covering said projecting wall, said cap being formed integrally with one of said first and second resinous filling corresponding to said selected injection port from said first and second injection ports.

8. The motor according to claim 7 wherein said first bearing means includes a bearing having a flange and being adjustable during assembly and wherein said casing has a bearing mounting portion for guiding said flange along the radial direction for adjustment of the bearing.

9. The motor according to claim 8 further comprising flange pressing means for axially restraining said flange against said bearing mounting portion, in order to guide said flange along the radial direction, in order to said flange along the radial direction, in cooperation with said bearing mounting portion.

* * * * *